Patented Nov. 18, 1924.

1,515,950

UNITED STATES PATENT OFFICE.

HARRY HILDENBRAND, OF NEW YORK, N. Y.

METAL POLISH.

No Drawing.    Application filed April 1, 1920.    Serial No. 370,473.

*To all whom it may concern:*

Be it known that I, HARRY HILDENBRAND, a citizen of the United States, residing at New York city, in the county of New York and State of New York, have invented certain new and useful Improvements in Metal Polish; and I do declare the following to be a full, clear, and exact description of the invention, such as will enable others skilled in the art to which it appertains to make and use the same.

This invention relates to an improved metal-polish and the method of making the same.

The main object of this invention is to provide an improved liquid metal polish which is exceedingly easy to apply to the metal, which cleanses all kinds of metal with comparatively little exertion, which requires comparatively little of the polish for cleansing and polishing a given amount of metal surface, which is non-explosive and non-combustible, and in which the solid ingredients will not settle to the bottom at low temperatures.

This metal-polish or liquid-composition comprises the following ingredients, viz., silicon-powder, water, ammonia, kerosene, technical acid oleinic and lemon-oil or other appropriate vegetable oil. The silicon-powder preferably employed is known as "Carrara, O Grade," and is a marble dust. The ammonia is preferably aqua-ammonia of the 26% grade. The acid oleinic is otherwise known as "red oil." Crude oil may be used instead of the technical acid oleinic.

In preparing this composition, the following method is preferably employed, viz:—

The first step of the method consists in making a mixture of silicon-powder which is a marble dust and water and aqua-ammonia, and the second step consists in making a solution of kerosene, acid oleinic and lemon oil or other vegetable oil, and the third step consists in mixing said mixture with said solution.

The following proportions, by weight, of the ingredients are found very satisfactory, viz, 16 parts of silicon-powder, 16 parts of water, part of aqua-ammonia, 18 parts of kerosene, 2 parts of acid oleinic and 1 part of lemon oil or the like.

The solution of kerosene, acid oleinic and lemon oil should be slightly heated before mixing with the mixture of silicon-powder, water and aqua-ammonia, and the whole mixture should be thoroughly intermingled by stirring while warm.

The silicon-powder is an important ingredient of the preparation because it serves both as a cleaning agent and as a polishing agent, and because it has a tendency to remain in suspension in the liquid constituents of the preparation at low temperatures, for instance, below 55° Fahrenheit. Hence, when the preparation has been kept at such low temperatures, it hardly requires to be shaken before being used.

It should be understood that this invention is not limited to the exact proportions and specific ingredients specified in the foregoing, but changes may be made within the scope of the appended claim.

What I claim as my invention is:

A metal polishing composition composed of the following ingredients substantially in the proportions given, viz., 16 parts marble dust, 16 parts water, 1 part aqua-ammonia, 18 parts kerosene, 2 parts acid oleinic and 1 part lemon-oil.

In testimony whereof I have hereunto set my hand.

HARRY HILDENBRAND.